United States Patent
Matsumoto et al.

(10) Patent No.: US 11,455,795 B2
(45) Date of Patent: Sep. 27, 2022

(54) IMAGE PROCESSING APPARATUS, IMAGE PROCESSING METHOD, IMAGE PROCESSING PROGRAM, AND RECORDING MEDIUM STORING PROGRAM

(71) Applicant: FUJIFILM Corporation, Tokyo (JP)

(72) Inventors: Tetsuya Matsumoto, Tokyo (JP); Kei Yamaji, Tokyo (JP); Shinichiro Sonoda, Tokyo (JP); Nobuya Tanaka, Tokyo (JP); Hirotoshi Yoshizawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/907,542

(22) Filed: Jun. 22, 2020

(65) Prior Publication Data
US 2021/0004596 A1 Jan. 7, 2021

(30) Foreign Application Priority Data
Jul. 3, 2019 (JP) .............................. JP2019-124707

(51) Int. Cl.
*G06T 7/70* (2017.01)
*G06V 20/20* (2022.01)

(52) U.S. Cl.
CPC ................ *G06V 20/20* (2022.01); *G06T 7/70* (2017.01)

(58) Field of Classification Search
CPC .............. G06F 16/583; G06F 16/9536; G06K 9/00671; G06T 7/70; G06V 20/20; G06V 20/35
See application file for complete search history.

(56) References Cited

U.S. PATENT DOCUMENTS

| | | | |
|---|---|---|---|
| 2003/0236716 A1* | 12/2003 | Manico .............. | H04N 1/00132 705/500 |
| 2011/0025873 A1* | 2/2011 | Wang ................ | H04N 5/232935 348/222.1 |
| 2011/0150278 A1* | 6/2011 | Shimizu ............. | G06K 9/00288 382/103 |
| 2013/0004064 A1* | 1/2013 | Yamaguchi ............ | G06V 10/40 382/164 |
| 2014/0301653 A1* | 10/2014 | Murphy-Chutorian ...................... | G06V 30/413 382/224 |
| 2016/0180235 A1* | 6/2016 | Sabah ................ | G06Q 30/0269 706/52 |
| 2017/0186080 A1 | 6/2017 | Furuya | |

FOREIGN PATENT DOCUMENTS

| | | |
|---|---|---|
| JP | 2016009459 A | 1/2016 |
| JP | 2017117362 A | 6/2017 |

* cited by examiner

*Primary Examiner* — Syed Haider
(74) *Attorney, Agent, or Firm* — Studebaker & Brackett PC

(57) ABSTRACT

Provided are an image processing apparatus, an image processing method, an image processing program, and a recording medium for the program, which make it possible to understand a unique way of spending time of a certain user at an event.

A first attribute obtained from images captured by a first user and a second attribute obtained from images, captured by many second users whose number is larger than the number of the first user, among images of the same event are detected. The first attribute represents a feature of the first user having a unique way of spending time at the event. According to the first attribute, information on products or the like suitable for the first user is notified to the first user.

12 Claims, 10 Drawing Sheets

FIG. 5

IMAGES OF CHRISTMAS EVENT

IMAGES OF USER 1
C1 C2 C3 C4 C5
— — — — —
— — — — —
— — — C19 C20

IMAGES OF USER 2
C21 C22 C23 C24 C25
— — — — —
— — — — —
— — — C39 C40

IMAGES OF USER 3
C41 C42 C43 C44 C45
— — — — —
— — — — —
— — — C59 C60

IMAGES OF USER 4
C61 C62 C63 C64 C65
— — — — —
— — — — —
— — — C79 C80

IMAGES OF USER 5
C81 C82 C83 C84 C85
— — — — —
— — — — —
— — — C99 C100

IMAGES OF USER 6
C101 C102 C103 C104 C105
— — — — —
— — — — —
— — — C119 C120

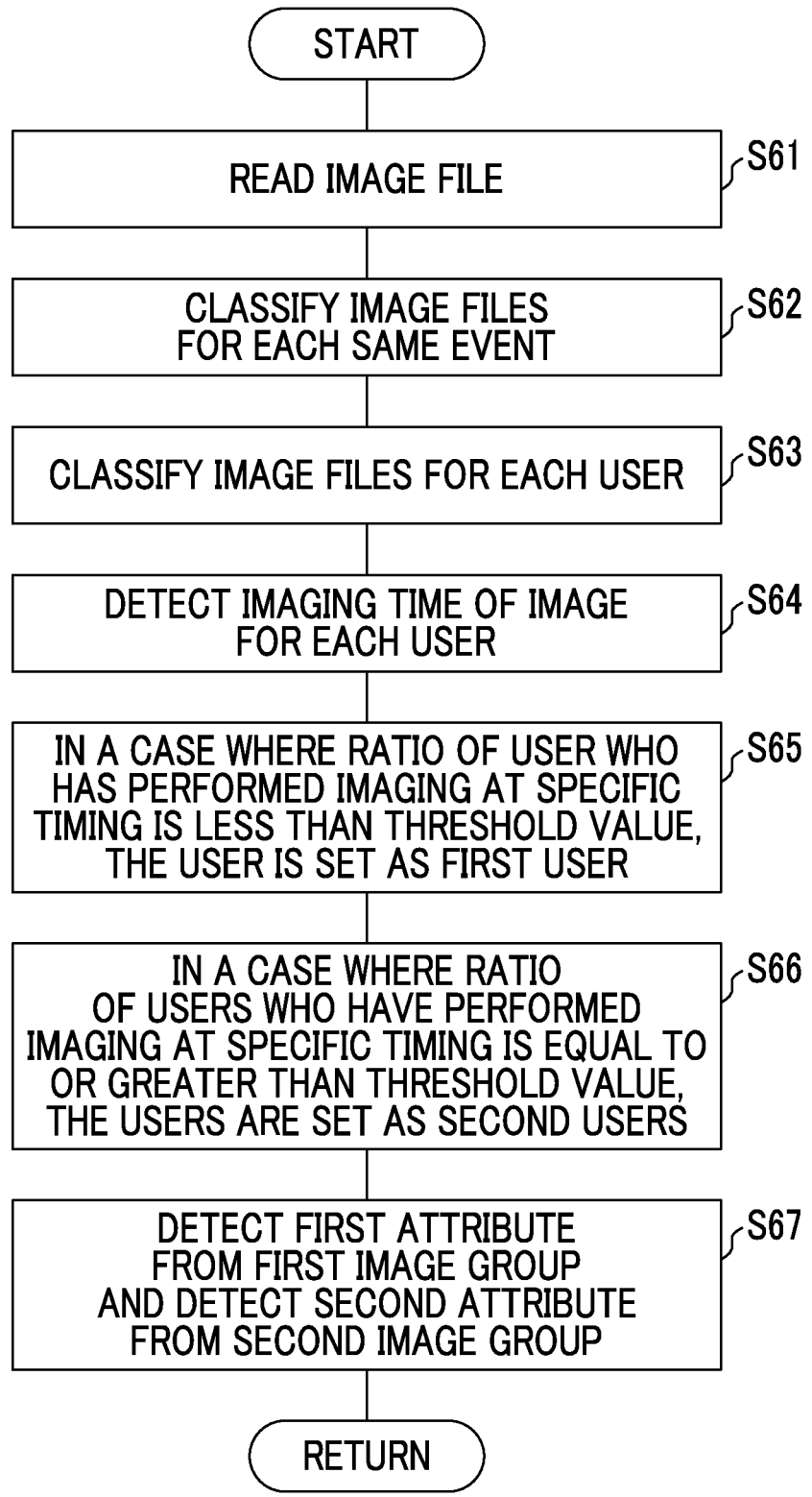

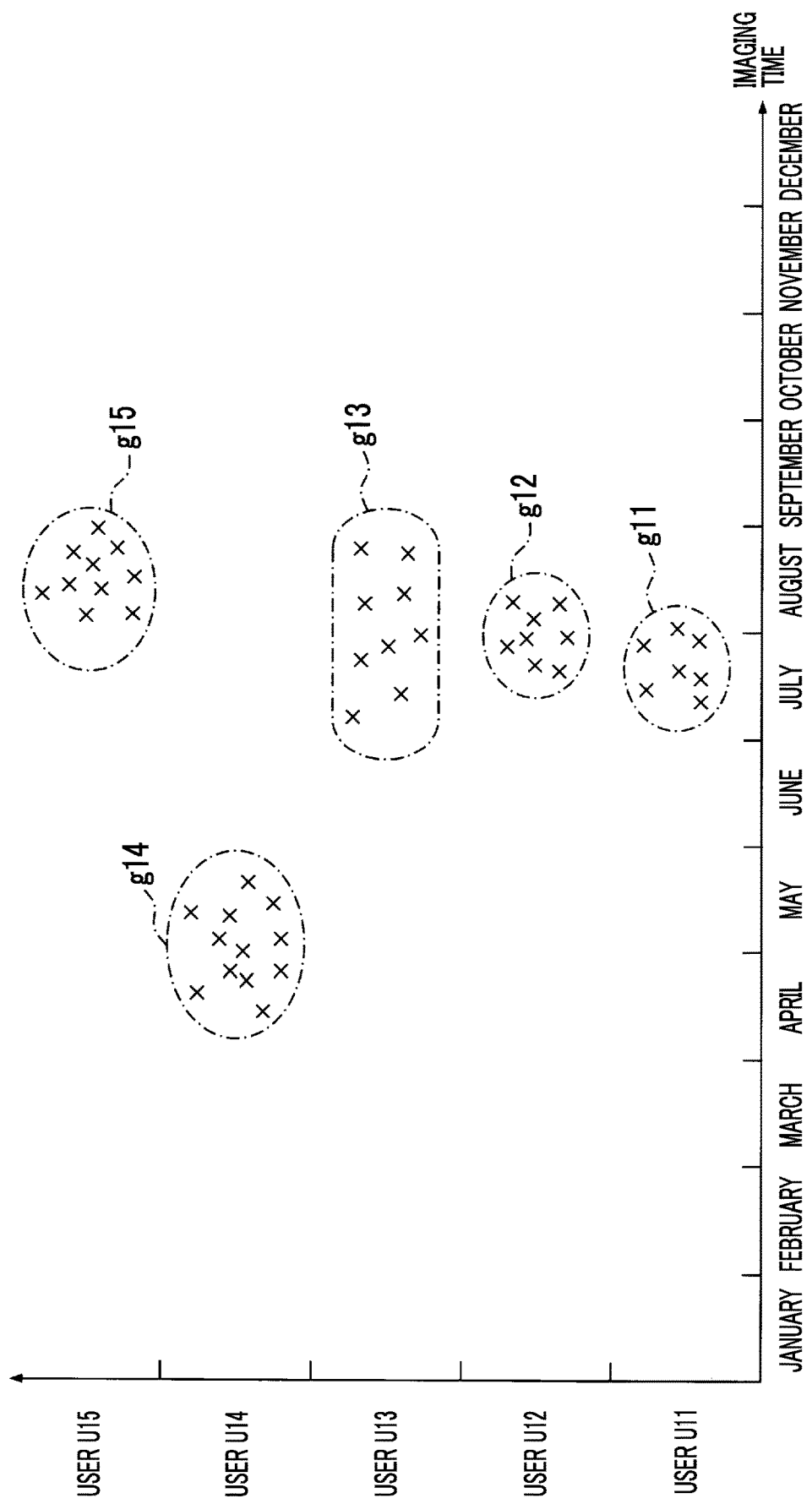

IMAGE PROCESSING APPARATUS, IMAGE PROCESSING METHOD, IMAGE PROCESSING PROGRAM, AND RECORDING MEDIUM STORING PROGRAM

CROSS-REFERENCE TO RELATED APPLICATIONS

The present application claims priority under 35 U.S.C. § 119 to Japanese Patent Application No. 2019-124707, filed Jul. 3, 2019. Each of the above application(s) is hereby expressly incorporated by reference, in its entirety, into the present application.

BACKGROUND OF THE INVENTION

1. Field of the Invention

The present invention relates to an image processing apparatus, an image processing method, an image processing program, and a recording medium that stores the program.

2. Description of the Related Art

In a case where a user searches for a product, a service, or the like using an Internet search site, it takes time to access the site for purchasing the target product, service, or the like if the user does not know the specific product name, service name, or the like. For this purpose, there is a technique of acquiring information on a product, a service, or the like using an image captured by a user (JP2016-009459A). In addition, there is also a technique of providing information related to customer's hobbies and preference when shopping at a store (JP2017-117362A).

SUMMARY OF THE INVENTION

At events such as Christmas, many families decorate their homes with Christmas trees, eat chicken or Christmas cakes, and drink champagne. However, some families may have a way of spending time different from the way of spending time of most families. Just like the majority of families, in a case where such families are merely offered at Christmas to encourage a purchase of products for decorating Christmas trees, products such as chicken, Christmas cake, and champagne, and other products, this is an unsatisfactory guide for such families. The technique disclosed in JP2016-009459A merely obtains information on products or services using images captured by a user, but in a case where a user's family is an unusual family having a unique way of spending time different from those of the majority of families, a method for getting necessary information for the family is not considered. Further, the technique disclosed in JP2017-117362A merely provides information related to hobbies and preferences of a customer when shopping at a store, but in a case where a user's family is a unusual family having a unique way of spending time different from those of the majority of families, a method for getting necessary information for the family is not considered.

It is an object of the present invention to provide a technique capable of finding information suitable for a user having a unique way of spending time at an event or the like.

According to an aspect of the present invention, there is provided an image processing apparatus including: a reading device that reads, from a storage device in which a plurality of images captured at the same event are stored, the plurality of images and an attribute detecting device (attribute detecting means) that detects a first attribute obtained from a first image group captured by a first user, which is different from a second attribute obtained from a second image group captured by second users of which the number is larger than the number of the first user, among the plurality of images read by the reading device.

According to another aspect of the present invention, there is provided an image processing method. That is, an image reading device reads a plurality of images from a storage device in which the plurality of images captured at the same event are stored, and an attribute detecting device (attribute detecting means) detects a first attribute obtained from a first image group taken by a first user among the plurality of images read by the reading device, which is different from a second attribute obtained from a second image group captured by second users of which the number is larger than the number of the first user.

Further, according to still another aspect of the present invention, there is provided an image processing apparatus including: a reading device that reads, from a storage device in which a plurality of images captured at the same event are stored, the plurality of images; and an processor that detects a first attribute obtained from a first image group captured by a first user, which is different from a second attribute obtained from a second image group captured by second users of which the number is larger than the number of the first user, among the plurality of images read by the reading device. Further, according to still another aspect of the present invention, there is provided a program for controlling a computer of the image processing apparatus, and a recording medium that stores the program.

In addition, according to still another aspect of the present invention, there is provided an image processing apparatus including: a reading device that reads a plurality of images from a storage device in which the plurality of images captured at the same event are stored; and a processor, in which the processor may perform a process of detecting a first attribute obtained from a first image group taken by a first user among the plurality of images read by the reading device, which is different from a second attribute obtained from a second image group captured by second users of which the number is larger than the number of the first user.

The image processing apparatus may further include a subject detecting device (subject detecting means) that detects a subject from each of the plurality of images. In this case, for example, the attribute detecting device detects the first attribute obtained from a first subject detected from the first image group, which is different from the second attribute obtained from a second subject detected from the second image group.

It is preferable that the number of the second subjects is larger than the number of the first subject.

The image processing apparatus may further include a main subject detecting device (main subject detecting means) that detects a main subject from each of the plurality of images. In this case, for example, the attribute detecting device detects the first attribute obtained from a first main subject detected from the first image group, Which is different from the second attribute obtained from a second main subject detected from the second image group.

It is preferable that the number of the second main subjects is larger than the number of the first main subject.

The first attribute is obtained from a plurality of images captured periodically by the first user, for example.

For example, the first attribute is obtained from an imaging time of the first image group, and the second attribute is obtained from an imaging time of the second image group.

The information processing apparatus may further include a first notifying device (first notifying means) that issues notification of event-related information on at least one of a product or a service related to the event on the basis of the first attribute detected by the attribute detecting device.

The notifying device may issue notification of the information on at least one of the product or the service related to the event at a time determined on the basis of the first attribute detected by the attribute detecting device.

The notifying device notifies the first user of the information, for example.

The first attribute is information on a unique way of spending time of the first user different from those of many users at an event. Since the first attribute is known, the unique way of spending time of the first user at the event is known.

BRIEF DESCRIPTION OF THE DRAWINGS

FIG. 5 shows an example of an image of a Christmas event.

FIG. 9 is a flowchart illustrating a processing procedure of the storage server.

FIG. 10 shows a relationship between an imaging time and an image captured by a user.

DESCRIPTION OF THE PREFERRED EMBODIMENTS

First Embodiment

Figure 1:
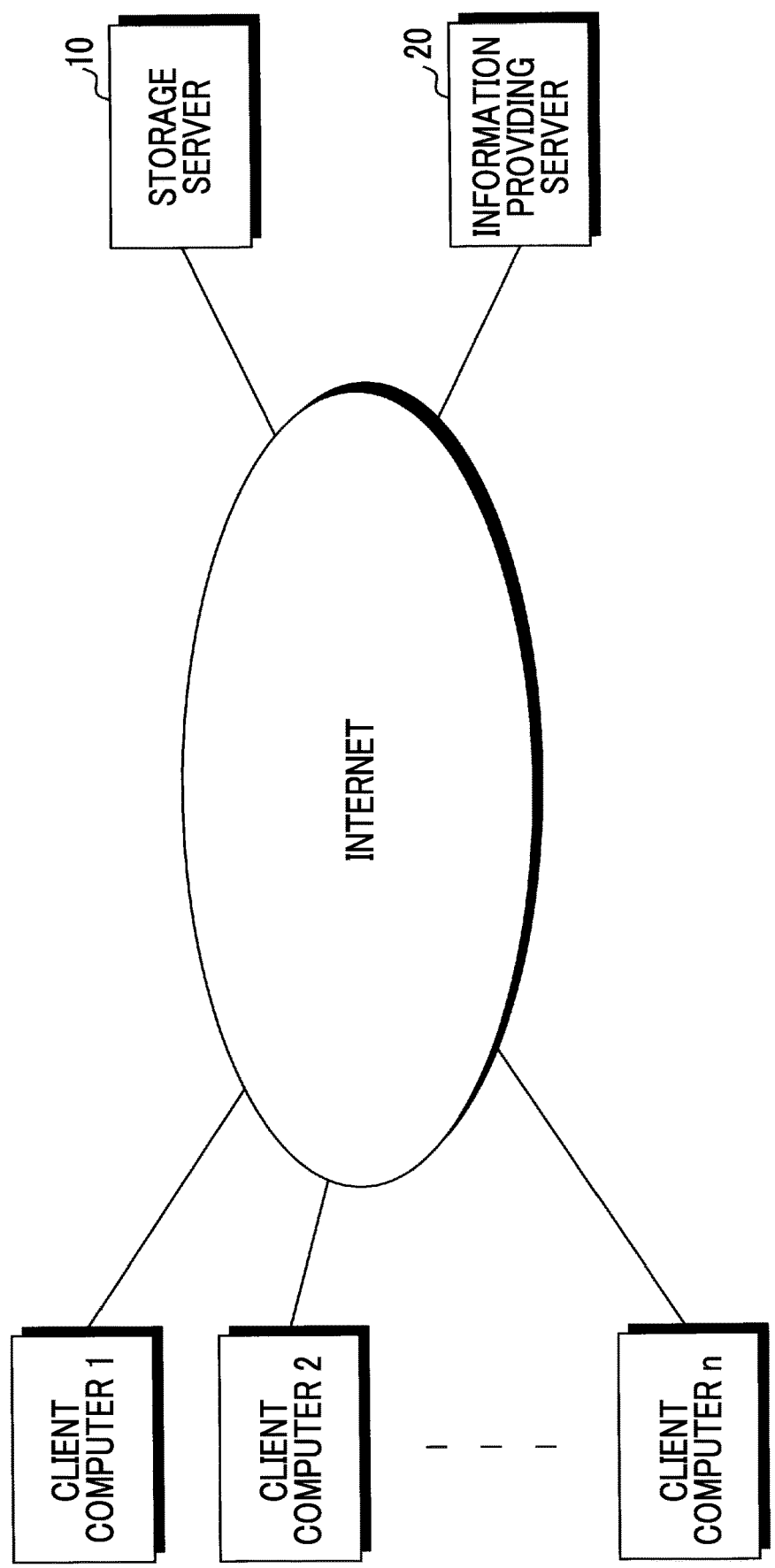
FIG. 1 shows an outline of an image processing system.

FIG. 1 shows an embodiment of the present invention, which shows an outline of an image processing system.

The image processing system includes n client computers 1 to n (in which n is an integer greater than 1), and these n client computers 1 to n are connected to the Internet. Further, the image processing system also includes a storage server 10 and an information providing server 20, and each of the storage server 10 and the information providing server 20 is able to communicate with each of the n client computers 1 to n through the Internet.

As the client computers 1 to n transmit an image file that represents an image captured by a user to the storage server 10, the storage server 10 receives and stores the image file transmitted from the user. The information providing server 20 transmits information to the user, but the storage server 10 may transmit information to the user.

Although the n client computers 1 to n are shown in FIG. 1, only one client computer may be included in the image processing system. Regardless of the number of client computers, it is sufficient if a plurality of users can upload image data to the storage server 10 using the client computers. Further, a communication device such as a smartphone may be used instead of the client computers 1 to n.

Further, the image processing system may be configured without using the information providing server 20.

Figure 2:
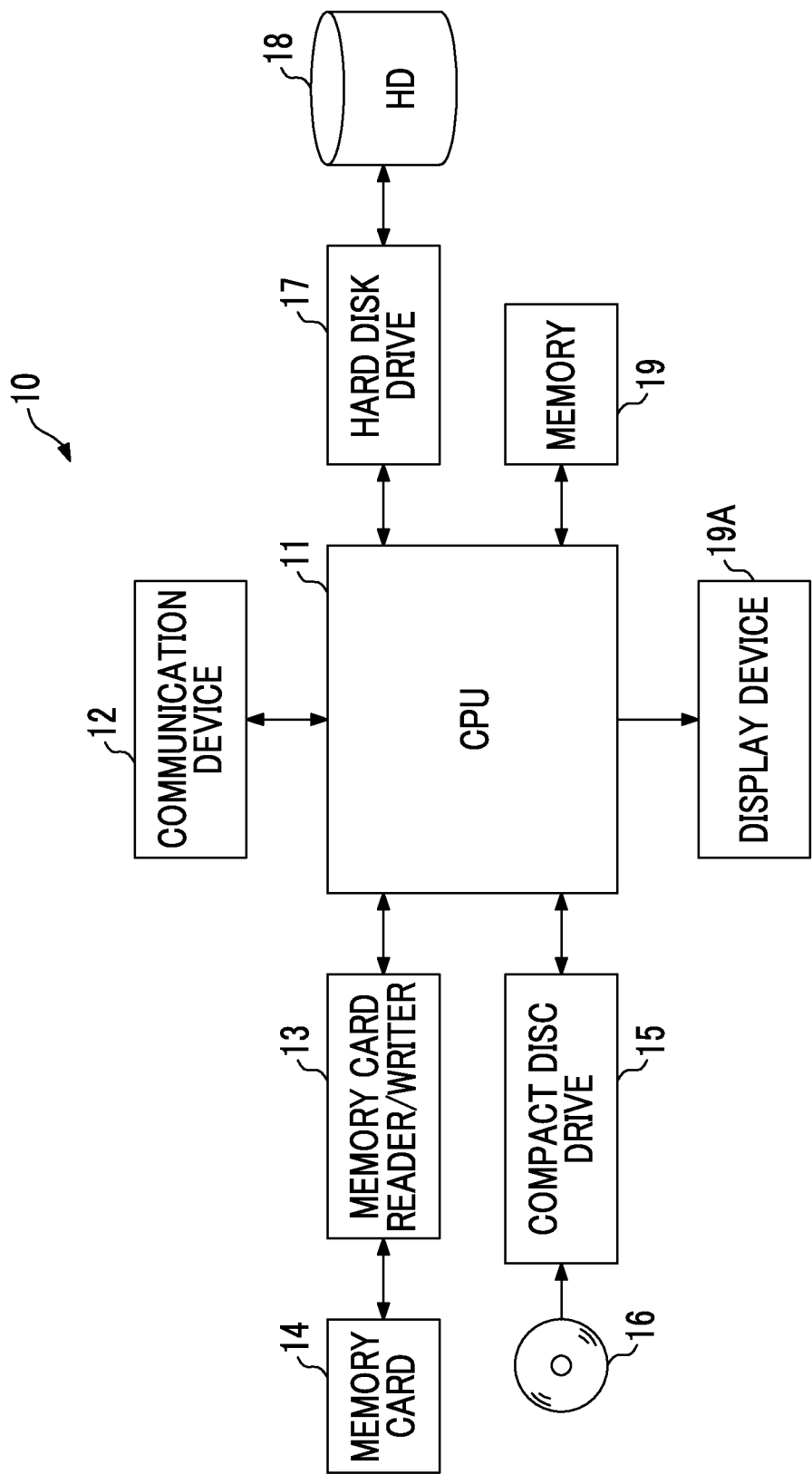
FIG. 2 is a block diagram illustrating an electrical configuration of a storage server.

FIG. 2 is a block diagram illustrating an electrical configuration of the storage server 10.

An overall operation of the storage server 10 (which is an example of an image processing apparatus) is controlled by a central processing unit (CPU) 11.

The storage server 10 includes a communication device 12 for connecting to the Internet, a memory card reader/writer 13 for accessing a memory card 14, and a compact disc drive 15 for reading data or the like recorded on a compact disc 16, a hard disk 18 for recording an image file or the like transmitted from a user, and a hard disk drive 17 for writing an image file to the hard disk 18 and reading an image file from the hard disk 18. Further, the storage server 10 also includes a memory 19 and a display device 19A.

A program for controlling the operation of the storage server 10 is stored on the compact disc 16 (portable recording medium), and the program recorded on the compact disc 16 is read by the compact disc drive 15 and is installed to the storage server 10. The program may be received by the storage server 10 through a network such as the Internet instead of being read from the compact disc 16 and being installed to the storage server 10, and the received program may be installed to the storage server 10. The information providing server 20 includes a CPU, a memory, a communication device, and the like, similar to the storage server 10.

In this embodiment, a first user who is considered to have a unique way of spending time different from a usual way of spending time at a certain event is found, and information on products and services that match the unique way of spending time is provided to the first user.

Figure 3:
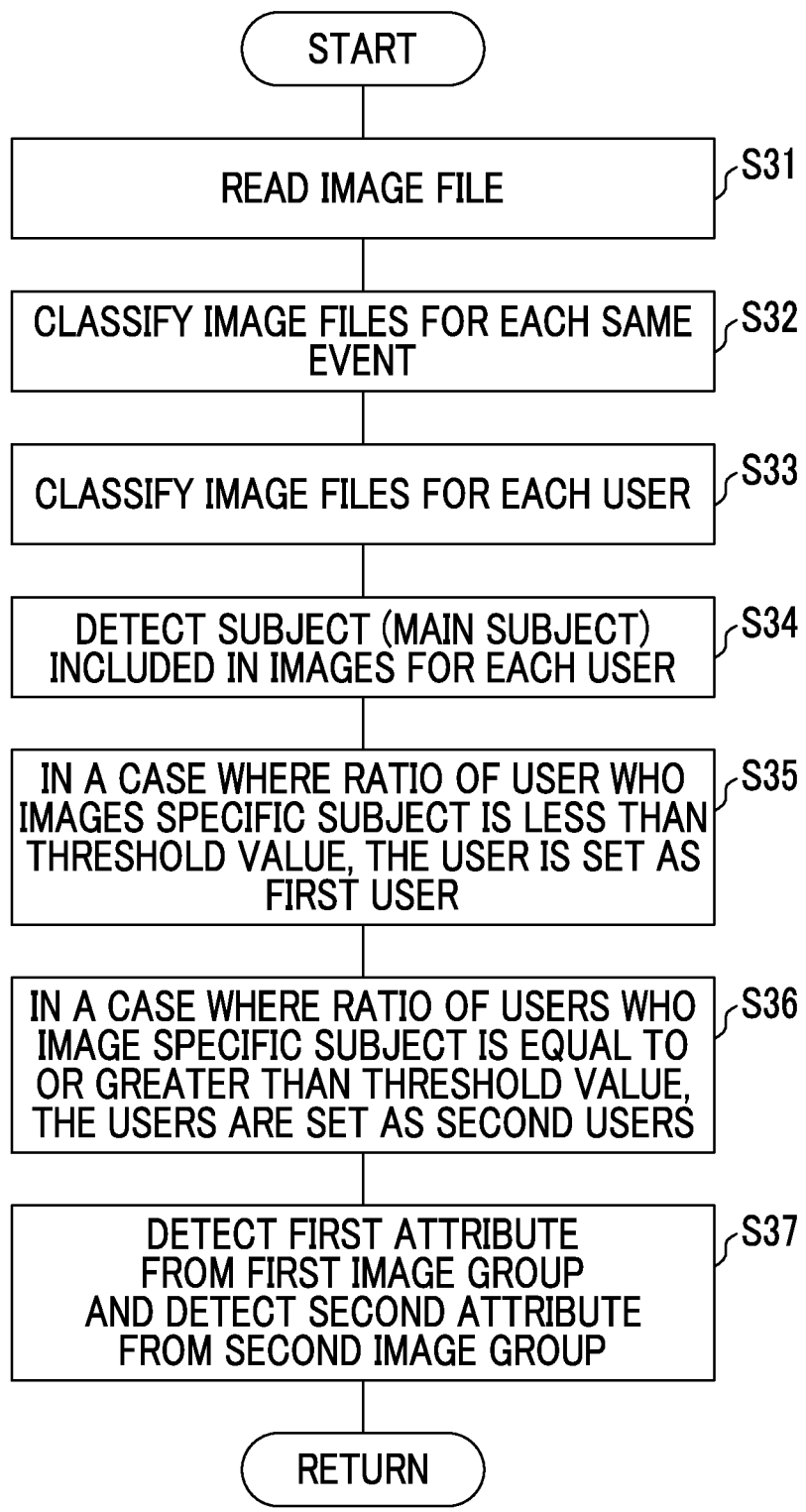
FIG. 3 is a flowchart illustrating a processing procedure of a storage server.

FIG. 3 is a flowchart illustrating a processing procedure of the storage server 10. The process shown in FIG. 3 is a process of detecting a first attribute from a plurality of images (a first image group) captured by the first user and detecting a second attribute from a plurality of images (a second image group) captured by the second users. It is not essential that the second attribute need is detected. The process shown in FIG. 3 may be started at any time, or may be started at a time slightly before a time when a specific event is performed. The first attribute is a feature different from a feature of an event, and is a feature unique to an image group of the first user, which will be described later. The second attribute may be the same as or different from the feature of the event, and is a feature common to an image group of the second users, which will be described later. The first attribute and the second attribute are different from each other.

The hard disk 18 (an example of a storage device) of the storage server 10 stores a plurality of image files transmitted from the client computers 1 to n of a plurality of users. The plurality of image files stored on the hard disk 18 are read by the hard disk drive 17 (an example of a reading unit) (step 31). The read image files are classified by the CPU 11 for each same event (step 32).

Figure 4:
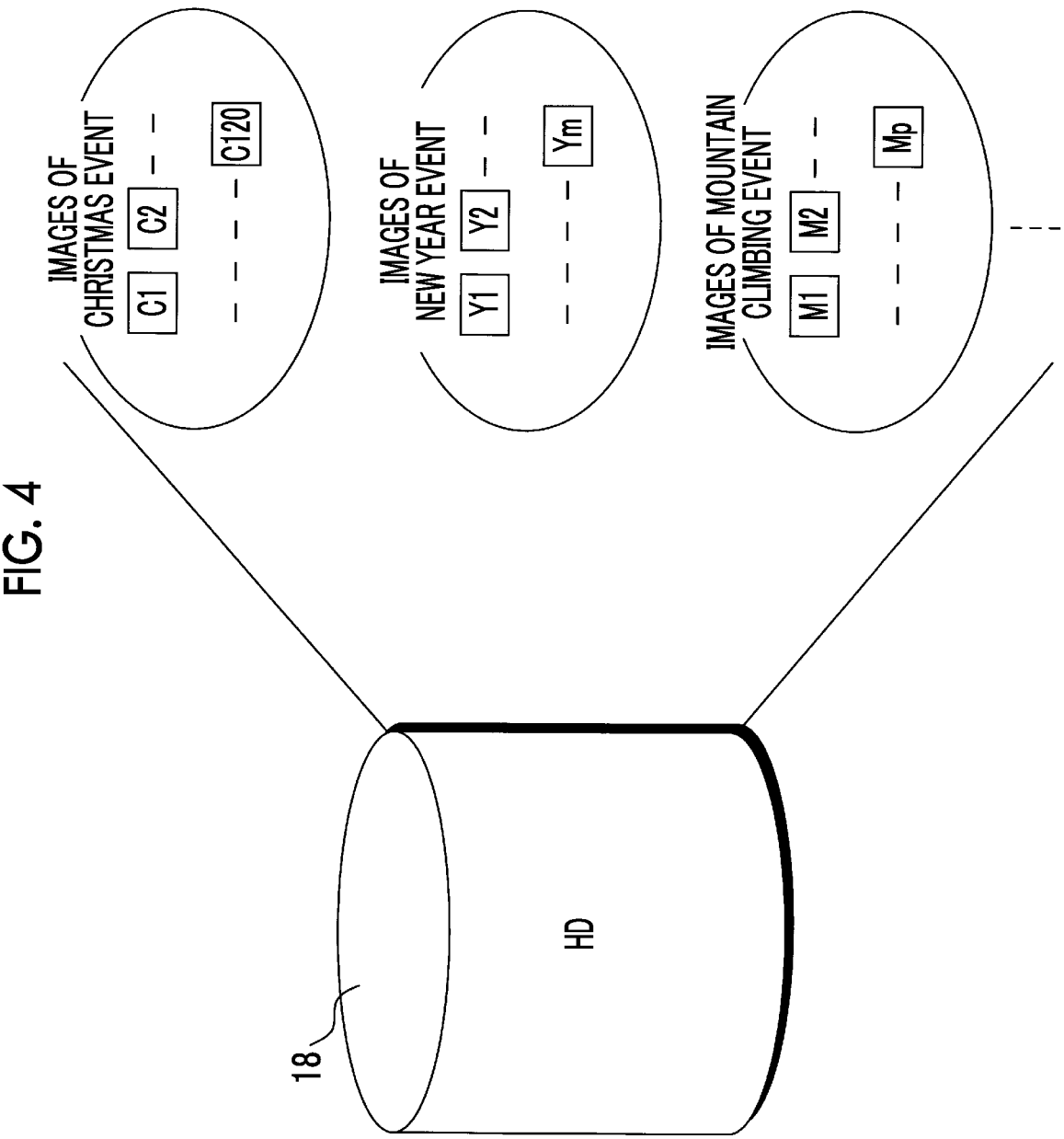
FIG. 4 shows an example of an image stored on a hard disk.

FIG. 4 shows a state in which images of a plurality of users stored on the hard disk 18 are classified for each same event.

Images C1 to C120 are grouped as images of the Christmas event, images Y1 to Ym are grouped as images of a New Year event, and images M1 to Mp are grouped as images of a mountain climbing event. With respect to other events, similarly, images are grouped for each same event.

In a case where an event is recorded in a header of an image file, images are classified for each same event using the record. In a case where users enter images in an image contest related to an event, etc., the entered and transmitted images are classified as the image of the event. Further, in a case where a time at which an event is performed is determined, images captured at that time are classified as the images of the event. In this way, the images are classified for each same event. The classified images may not be stored separately in each specific area of the hard disk 18, and instead, a table may be created and image file names may be stored in the table so that the images of the same event can be identified, or information on the same event may be recorded in an image header. As long as image files for the same event can be read even in a case where the image files are not classified for each same event, the process of classifying the image files for each same event may not performed.

In a case where the images are classified for each same event, images for a specific event (which may be any event, but in a case where the process shown in FIG. 3 is performed at a period of time for an event, the event corresponding to the time becomes the specific event) are classified for each user by the CPU 11 (step 33). In a case where a user name, a user ID, or data corresponding thereto is recorded in a header of an image file, images are classified for each user using the user name, the user ID, or the data corresponding thereto. In a case where an image has been submitted to an image contest or the like, since a user name of an applicant can be known and a table or the like in which the user name is associated with the image is created, images are classified for each user using such a table. In this case, similarly, the images classified for each user may not be stored separately in each specific area of the hard disk 18, but instead, a table may be created and an image file name or the like may be stored in the table so that images of the same event can be known for each user, or information on the same user for the same event may be recorded in an image header. As long as image files of the same user at the same event can be read even in a case where the image files are not classified for the same user at the same event, the process of classifying the image files for the same user at the same event may not be performed.

FIG. 5 shows a state in which images of the same event called Christmas are classified for each user.

The image C1 to the image C20, the image C21 to the image C40, the image C41 to the image C60, the image C61 to the image C80, the image C81 to the image C100, and the image C101 to the image C120 are classified as images of a user U1, images of a user U2, images of a user U3, images of a user U4, images of a user U5, and images of a user U6, respectively. The images of the Christmas event are only images of the users U1 to U6.

Subsequently, for the same event, a subject (which may be a main subject) included in images classified for each user is detected by the CPU 11 (an example of a subject detecting unit and a main subject detecting unit) (step 34). In a case where a subject other than a main subject is detected, in order to prevent a subject that is accidentally captured from being detected, a method for detecting a subject having a predetermined size compared with the size of an entire image, detecting a subject that can be determined to be related to a person, such as a subject that is close to a person included in an image or is in contact with the person, or detecting a subject that appears more than a predetermined number of times in an image of a user may be considered. It is preferable to detect a plurality of subjects from one image, instead of detecting only one subject therefrom. In a case where a main subject is detected, it is possible to determine whether a subject is the main subject depending on a position in an image (as the position is closer to the center of the image, the subject is more likely to be the main subject), whether the subject is in focus (as the subject is more focused, the subject is more likely to be the main subject), whether the subject appears more than a predetermined number of times in the user's image, or the like.

Figure 6:
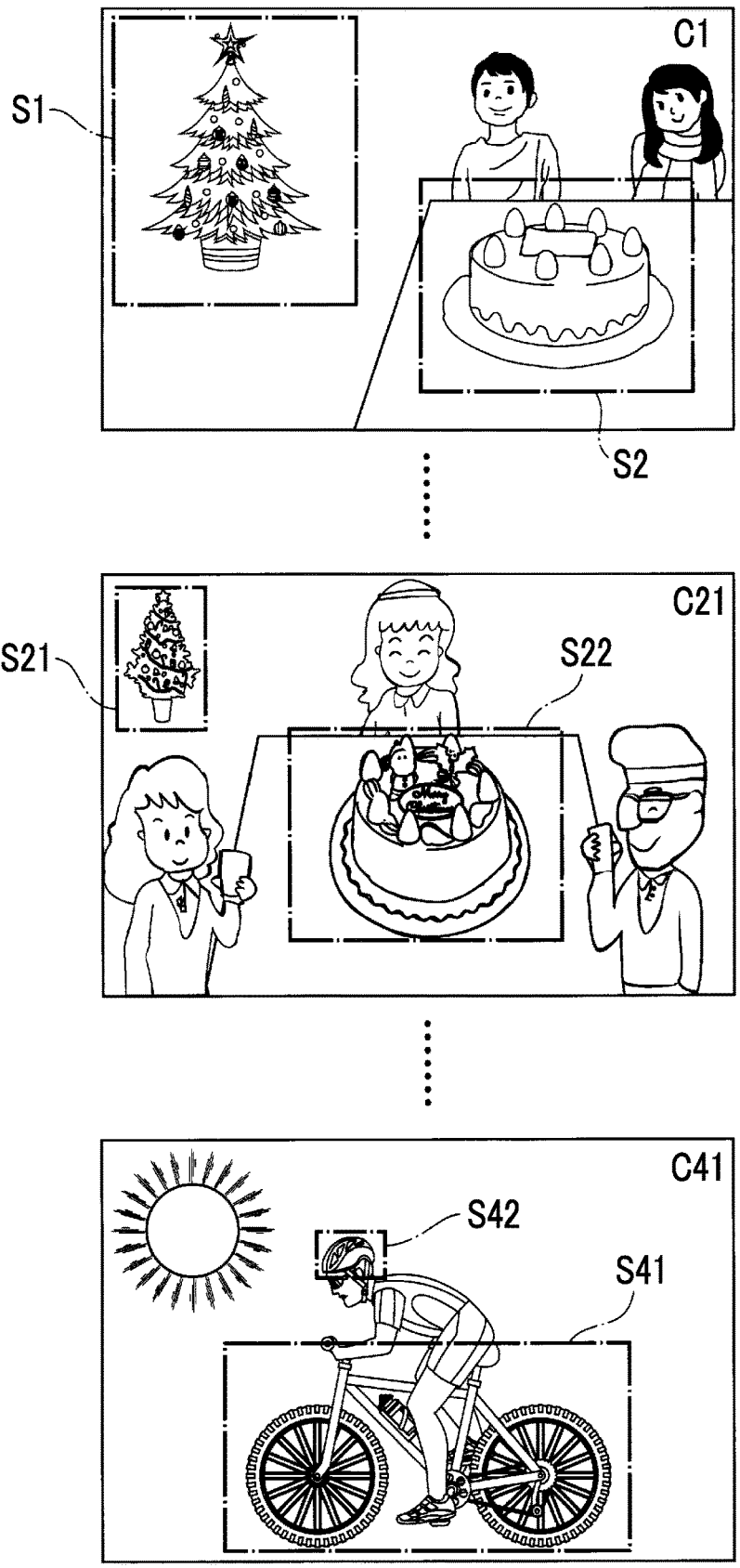
FIG. 6 shows an example of a user image.

FIG. 6 shows an example of images captured at a Christmas event.

FIG. 6 shows the image C1 of the images C1 to C20 of the user U1, the image C21 of the images C21 to C40 of the user U2, and the image C41 of the images C41 to C60 of the user U3.

A Christmas tree S1 and a cake S2 are detected from the image C1 of the user U1, and a Christmas tree S21 and a cake S22 are also detected from the image C21 of the user U2. A bicycle S41 and a cycle cap S42 are detected from the image C41 of the user U3. Subjects are similarly detected for the images C2 to C20 other than the image C1 among the images C1 to C20 of the user U1, subjects are similarly detected for the images C22 to C40 other than the image C21 among the images C21 to C40 of the user U2, and subjects are similarly detected for the images C42 to C60 other than the image C41 among the images C41 to C60 of the user U3. In addition, subjects are similarly detected for images of the users U4 to U6 other than the users U1, U2, and U3.

In a case where a subject is detected from all the images C1 to C120 of the plurality of users U1 to U6 related to the same event, in a case where a ratio of a user who imaged a specific subject is less than a threshold value (a first threshold value, for example, 0.50%) among the plurality of users U1 to U6 related to the same event, the user is set as a first user (step 35). Then, a specific subject imaged by the first user determined in this way becomes a first subject. For example, in a case where a bicycle or a cycle cap is not detected from the images of the users U1, U2, U4, U5, and U6 but is detected from the image of the user U3, since the number of the user U3 is one and the number of the plural users U1 to U6 of the same event is six, the ratio of a user who imaged the bicycle or the cycle cap (⅙=16.7% in this embodiment) is less than the threshold value. Accordingly, the bicycle or the cycle cap becomes the first subject, and the user U3 becomes the first user. The threshold value may be another value. Further, a main subject may be detected instead of the subject. Whether or not a certain subject is the main subject is determined by the CPU 11 by considering an arrangement position in an image. For example, as the position is closer to the center, the subject is more likely to be the main subject, and as the subject is more focused, the subject is more likely to be the main subject. Further, for example, in a case where the size of the subject in the entire image is equal to or greater than a predetermined value, the subject is considered as the main subject.

The subject (main subject) detected in this way is a subject (main subject) that is unusually imaged at the event. It may be considered that a user who images such an unusual subject (main subject) performs a way of spending time different from a usual way of spending time at the event.

In the above description, in a case where a specific subject is detected from any one of images of the first user at the same event, the specific subject is determined to be "detected". However, only in a case where a ratio of appearance of the detected subject to the number of images of the user is equal to or greater than a second threshold value (for example, the second threshold value is 10%, and the second value may be different from the first threshold value), the specific subject is determined to be "detected", and then, the ratio of the user may be calculated as described above. In a case where a specific user performs an unusual way of spending time and an unusual subject appears in an image, it is possible to prevent the first user from being determined on the basis of such an unusual subject. In the above-described example, in a case where the number of images for which the "bicycle" or "cycle cap" is detected among twenty images C41 to C60 of the user U3 is 2 or more, it is determined that the "bicycle" or "cycle cap" was detected in the image of the user U3, but in a case where the number of images for which the "bicycle" or "cycle cap" is detected is less than 2, it is determined that the "bicycle" and the "cycle cap" were not detected.

Similarly, in a case where a ratio of users who imaged a specific subject among the plurality of users U1 to U6 related to the same event is equal to or greater than the threshold value (for example, 50%), the users are set as second users (step 35). Then, the specific subject imaged by the second user determined in this way is a second subject. For example, at a Christmas event, in a case where a subject such as "Christmas tree" or "cake" is detected from images of users of which the ratio of the number thereof is equal to or greater than the threshold value, the "Christmas tree" or "cake" is an example of the second subject.

As described above, in a case where the bicycle or the cycle cap is not detected from the images of the users U1, U2, U4, U5, and U6 but is detected from the image of the user U3, since the number of the user U3 is one and the number of plural users U1 to U6 of the same event is six, the user U3 is the first user, and the users U1, U2, U4, U5, and U6 are the second users.

In a case where the first user and the second user are determined by the CPU a first attribute is detected by the CPU 11 (an example of an attribute detecting unit) from the "bicycle" and the "cycle cap" (which is an example of the first subject as described above) detected from a first image group that are images of the first user, and a second attribute is detected by the CPU 11 from the "Christmas tree" and the "cake (which are examples of the second subjects as described above) detected from a second image group that are images of the second users (step 37). As described above, the first attribute and the second attribute represent different features among features obtained from images captured at the same event. The first attribute may be the first subject itself, or may be an attribute related to the first subject. Further, the second attribute may be the second subject itself, or may be an attribute related to the second subject. For example, in a case where the first subjects are "bicycle" and "cycle cap", the first attribute is "cycling", and in a case where the second subjects are "Christmas tree" and "cake", the second attribute is may be "Christmas".

Figure 7:
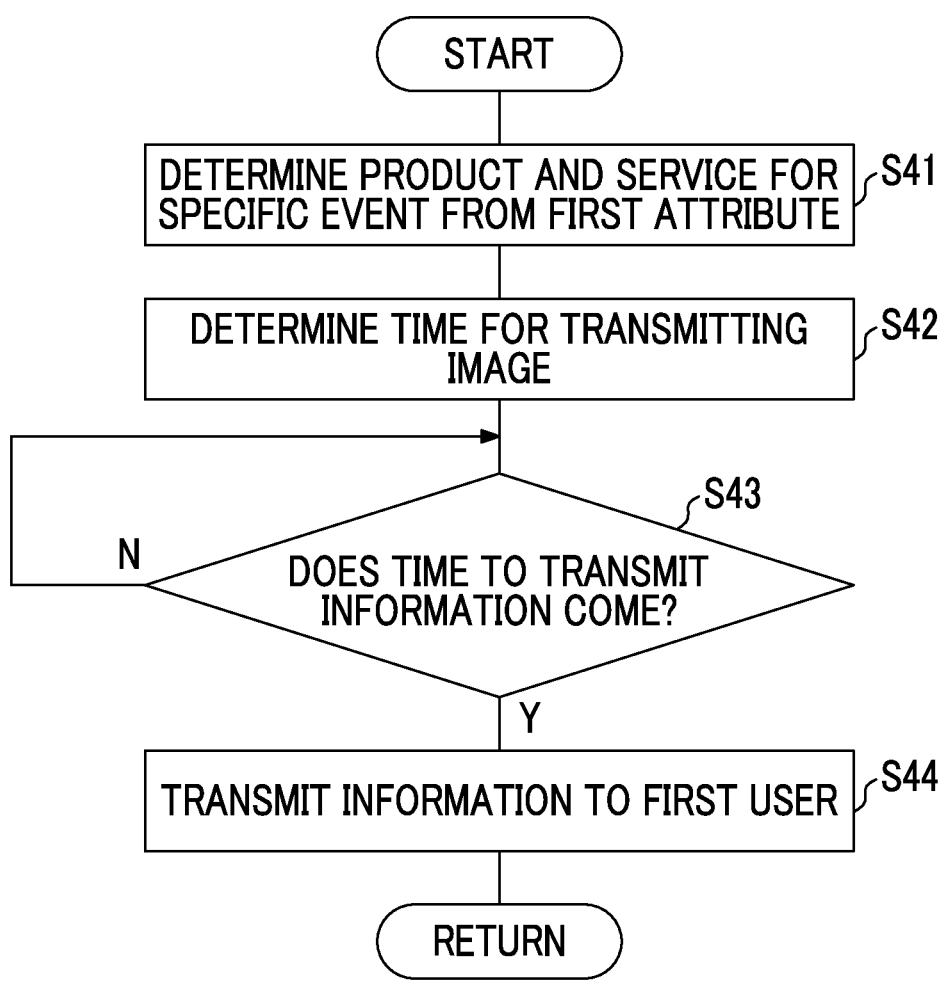
FIG. 7 is a flowchart illustrating an information transmission processing procedure.

FIG. 7 is a flowchart illustrating a processing procedure for transmitting information based on the detected first attribute to the first user. A process shown in FIG. 7 may be started in accordance with the end of the process shown in FIG. 3, or may be started at a time slightly before a time when a specific event is performed.

A product or a service is determined by the CPU 11 from the detected first attribute (step 41). The product is, for example, the first subject itself used for detecting the first attribute. For example, in a case where "bicycle" and "cycle cap" are detected as the first subjects, "bicycle" and "cycle cap" are determined as products. The service is, for example, a service related to the first subject used for detecting the first attribute. For example, in a case where "bicycle" and "cycle cap" are detected as the first subjects, there are provided a sales service, a rental service, a purchase service, a maintenance service, and a service (suggestion for invitation to travels and cycling events using bicycles) for leisure using the above services, for example.

In a case where the product or service is determined, a time for transmitting information on the product or service is determined by the CPU 11 (step 42). The transmission time may be a time when the product or service is determined, or may be a time slightly before a time when a specific event is performed. In a case where the transmission time comes (YES in step 43), information on the determined product or service is transmitted from the storage server 10 to the client computer of the first user by the communication device 12 (an example of a notifying unit) (step 44).

The first user comes to know specific information suitable for the first user. At the time of a specific event, the first user can know information unique to the first user, unlike general information corresponding to the specific event, so that the degree of satisfaction of the first user for the information is improved. Further, information indicating that the first user has a way of spending time different from that of the second user may be notified to the first user by the communication device 12.

In the process shown in FIG. 7, information on products and services is transmitted from the storage server 10 to the client computer of the first user, but instead, the information may be transmitted from the storage server 10 to the information providing server 20 and then may be transmitted from the information providing server 20 to the client computer of the first user, without being transmitted from the storage server 10 to client computer. A transmission destination of the first user can be known by storing a transmission source in the storage server 10 in a case where an image file is transmitted from the first user to the storage server 10.

Figure 8:
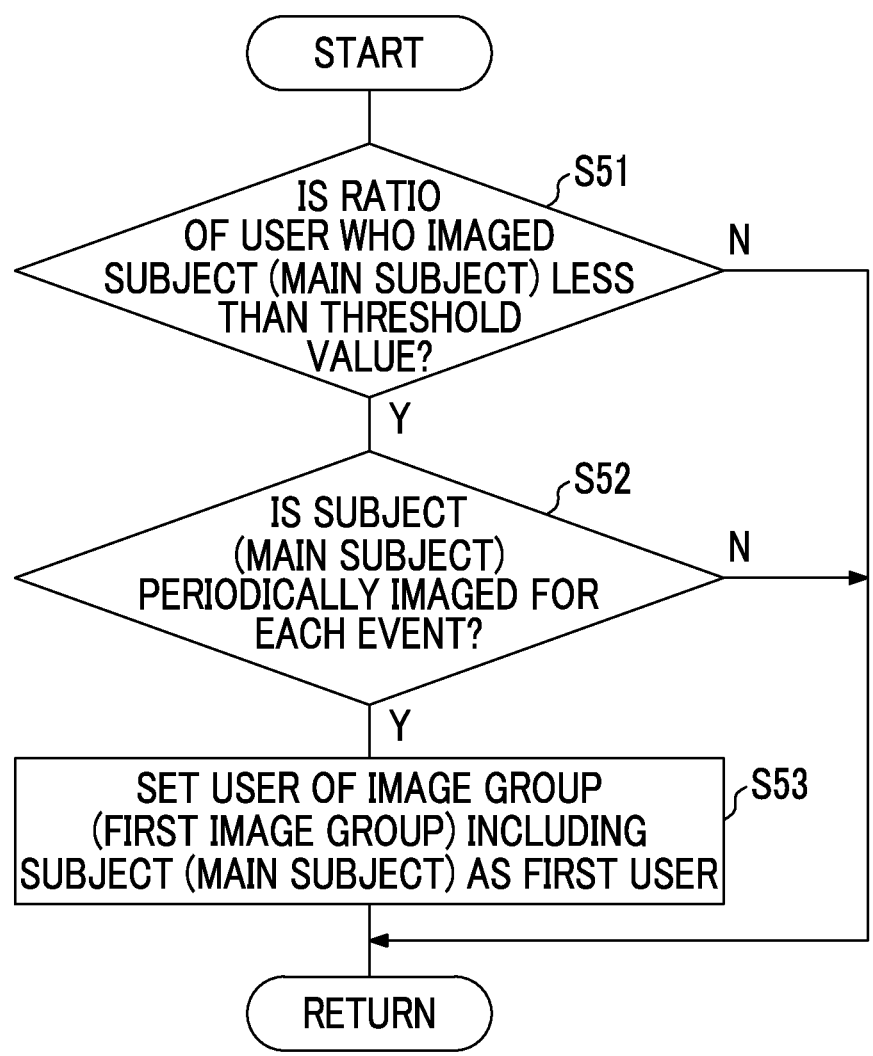
FIG. 8 is a flowchart illustrating a processing procedure for determining a first user.

FIG. 8 is a flowchart illustrating another processing procedure for determining the first user.

As described above, in a case where the ratio of the user who imaged a specific subject (first subject) to the total users who imaged the same event is less than the threshold value (YES in step 51), it is determined by the CPU 11 whether the specific subject (main subject) is periodically imaged for each event (step 52). In a case where imaging dates of image including a specific subject (main subject) are read and images captured whenever an event is performed includes the specific subject at a proportion of a certain frequency or higher, it is determined by the CPU 11 that the images are periodically captured.

In a case where it is determined by the CPU 11 that the specific subject (main subject) is periodically imaged for each event (YES in step 52), a user of an image group including the specific subject (main subject) is determined by the CPU 11 as the first user (step 53). As a result, the first attribute is obtained from a plurality of images that are periodically captured by the first user (step 37 in FIG. 3).

For example, in images of Christmas events, even in a case where the subject of "bicycle" was detected from the images since cycling was often performed in certain years, in a case where a usual way of spending time shows that the cycling was not performed at the Christmas events, and instead, Christmas tree decoration and cake eating were performed, it is possible to prevent detection of the subject of the "bicycle" from the images where the cycling was often performed and detection of the first attribute from the subject of the "bicycle". This is effective in a case where events are performed periodically.

According to the first embodiment, it is possible to find the first user who has a unique way of spending time different from a general way of spending time at the time of an event from subjects included in images captured by the first user, and to notify the first user of information on products, services, or the like suitable for the first user.

Second Embodiment

FIG. 9 is a flowchart illustrating a processing procedure of the storage server 10 according to another embodiment. The flowchart of FIG. 9 corresponds to the flowchart of FIG. 3.

In a similar way to the process shown in FIG. 3, an image file is read from the hard disk 18 of the storage server 10 by the hard disk drive 17 (step 61). The image file is classified for each same event by the CPU 11 (step 62). In a similar way to the case shown in FIG. 5, the image file is classified for each user for the same event by the CPU 11 (step 63).

Subsequently, an imaging time of an image represented by the image file classified for each user for the same event is detected for each user by the CPU 11 (step 64). In a case where the time of the event is determined, as in the Christmas in the first embodiment, it is not necessary to detect an imaging time of images captured by a user at the event. On the other hand, at an event in which a time of the event is not necessarily determined, as in an event such as "mountain climbing", instead of a time when many users are considered to perform the event (for example, a summer time in a case where the event is "mountain climbing"), a specific user may perform the event at another time (for example, a spring time in a case where the event is "mountain climbing"). For this reason, the CPU 11 detects the imaging time for each user.

FIG. 10 shows an example in which images of the mountain climbing event are distributed for each user according to imaging times.

A horizontal axis indicates an imaging time (imaging month), and a vertical axis indicates a user. It is assumed that there were five users from the user U11 to the user U15 who imaged the mountain climbing event. Crosses indicate images captured by the user U15 from the user U11.

Images captured by the user U11 are represented as an image group g11, and imaging times thereof are gathered almost in July. Images captured by the user U12 are represented as an image group g12, and imaging times thereof are gathered from July to August. Images captured by the user U13 are represented as an image group g13, and imaging times thereof are gathered in July and August. Images captured by the user U14 are represented as an image group g14, and imaging times thereof are from April to May. Images captured by the user U15 are represented as an image group g15, and imaging times thereof are gathered in August.

In a case where the ratio of a user who has performed imaging at a specific time among the users U11 to U15 who have imaged the same event for which the imaging times have been detected is less than a threshold value (first threshold, for example, 50%), the user is determined as the first user by the CPU 11 (step 65). For example, the threshold value is, for example, 50%, but instead, may be another value.

For example, in a case where the same event is mountain climbing, as shown in FIG. 10, among the images captured by the users U11 to U15, the images that form the image group g14 (which is an example of a first image group) were captured at a spring time (for example, April and May), and the remaining images that form the image groups g11, g12, g13, and g15 (which are examples of second image groups) were captured at a summer time (for example, July and August). The user who performed imaging at the spring time is the user U14, and the users who performed imaging at the summer time are the users U11, U12, U13, and U15. Since one user U14 performed imaging at the spring time and four users U11, U12, U13, and U15 performed imaging at the summer time, the ratio of the user U14 who performed imaging at the spring time to all the users U11 to U15 who captured the images of the same event (1/5=20% in this embodiment) is less than the threshold value. Accordingly, the user U14 of the images captured at the spring time becomes the first user.

The imaging time detected in this way is determined by the CPU 11 to be unusual for an imaging time at the event. It is considered that the user who performs the event (for example, mountain climbing) at such a time performs the event at a time different from a time when the event is generally performed.

With respect to the number of images of each user, a time at which images of which the number is equal to or greater than a second threshold value (for example, 50%, but may be different from the first threshold value) are captured may be set as an imaging time of the user. In a case where a specific user merely often performs an event at an unusual time, it is possible to prevent the first user from being determined on the basis of a small number of images often captured at such an unusual time.

Similarly, in a case where the ratio of users who have performed imaging at a specific time among the plurality of users U11 to U15 related to the same event is equal to or greater than a threshold value (the first threshold value, for example, 50%), the users are set as the second users by the CPU 11 (step 66). For example, in FIG. 10, since the users U11, U12, U13, and U15 captured images of the mountain climbing event at the summer time and the ratio thereof is 4/5=80%, the users U11, U12, U13, and U15 are set as the second users. The second image groups are the image groups g11, g12, g13, and g15 as described above.

In a case where the first user (for example, the user U14) and the second users (for example, the users U11, U12, U13, and U15) are determined by the CPU 11, a first attribute is detected by the CPU 11 from the imaging times (for example, April and May) detected from the first image group (for example, the image group g14) that corresponds to the images of the first user, and a second attribute is detected by the CPU 11 from the imaging times (for example, July and August) detected from the second image groups (for example, the image groups g11, g12, g13, and g15) that correspond to the images of the second users (step 67). The first attribute and the second attribute represent different features among features obtained from the images captured at the same event. The first attribute may be the first imaging time itself, and the second attribute may be the second imaging time itself.

In this way, in a case where the first user different from the second users at the time when the event is performed is known, as described with reference to FIG. 7, it is possible to transmit information on an event to the first user at a time suitable for a time when the event is to be performed (step 44). Here, such information may not be transmitted from the storage server 10 to the first user, but instead, may be transmitted from the information providing server 20 different from the storage server 10 to the first user.

The imaging time is not limited to the imaging month, but instead, may be an imaging year, an imaging date, an imaging time point, an imaging season determined, for example, according to four seasons, or the like. Further, at least the first attribute among the detected first and second attributes may be displayed on the display device 19A.

According to the second embodiment, it is possible to find the first user who is unique in terms of a time when an event is performed instead of the first user who is unique in a way of spending time an event, and to notify information at a time suitable for such a first user.

In any of the first and second embodiments described above, an administrator of the image processing system gets consent from a user to analyze images of the user and to transmit information on products, services, or the like to the user on the basis of the analysis result. Further, as described above, the information on the products, services, or the like may be transmitted to the user from the storage server 10 and the information providing server 20, but in a case where the information is transmitted from a system of an administrator different from the administrator of the image processing system, the user's consent is given to deliver the obtained information to the administrator different from the administrator of the image processing system. The information to be delivered is minimum necessary information such as an e-mail address of the user. Further, for example, in a case where information on a subject obtained by analyzing an image of a user is provided to a partner company of the image processing system, it is assumed that information on the user and information capable of specifying the user are not provided, and instead, the user is anonymized so that the user cannot be specified and user's consent should be given.

A processing unit that executes the above-described processing includes the CPU 11 that executes software to function as various processing units, and also, includes a programmable logic device of which a circuit configuration is changeable after manufacturing, such as a field-programmable gate array (FPGA), a dedicated electric circuit that is a processor having a circuit configuration specifically designed to execute a specific process, such as an application specific integrated circuit (ASIC).

One processing unit may be configured of one of these various processors, or may be configured of a combination of two or more processors of the same type or different types (for example, a plurality of FPGAs, a combination of a CPU and an FPGA). As an example in which a plurality of processing units is configured by one processor, first, as represented by a computer such as a client computer or a server, there is a form in which one processor is configured by a combination of one or more CPUs and software and the processor functions as a plurality of processing units. Second, as represented by a system-on-a-chip, there is a form in which a processor that realizes functions of an entire system including a plurality of processing units with one integrated circuit (IC) chip is used. As described above, the various processing units are configured using one or more various processors as a hardware structure.

Further, the hardware structure of these various processors is, more specifically, an electric circuit in which circuit elements such as semiconductor elements are combined.

EXPLANATION OF REFERENCES

1-*n*: Computer
10: Storage server
11: CPU
12: Communication device
13: Memory card reader/writer
14: Memory card
15: Compact disc drive
16: Compact disc
17: Hard disk drive
18: Hard disk
19: Memory
19A: Display device
20: Information providing server
C1-C120: Christmas event image
Y1-Ym: New Year event Image
M1-Mp: mountain climbing image
S1: Christmas tree
S2: Christmas cake
S21: Christmas tree
S22: Christmas cake
S41: Bicycle
S42: Cycle cap
U1-U6: User
U11-U15: User
g11-g15: Image group

What is claimed is:

1. An image processing apparatus comprising:
    a reading device that reads, from a storage device in which a plurality of images captured at the same event are stored, the plurality of images;
    a processor configured to:
        calculate a ratio of a number of users who imaged a specific subject among the plurality of images read by the reading device to a number of users who imaged the plurality of images read by the reading device, and
        decide a user who imaged the specific subject to be a first user based upon the calculated ratio; and
    an attribute detecting device that detects a first attribute obtained from a first image group captured at the same event by the first user, which is different from a second attribute obtained from a second image group captured at the same event by second users of which a number is larger than a number of the first user,
    wherein the user is set as the first user in a case where the calculated ratio is less than a threshold value, and the first attribute is set as a feature of the first user.

2. The image processing apparatus according to claim 1, further comprising:
    a subject detecting device that detects a subject from each of the plurality of images,
    wherein the attribute detecting device detects the first attribute obtained from a first subject detected from the first image group, which is different from the second attribute obtained from a second subject detected from the second image group.

3. The image processing apparatus according to claim 2, wherein the number of the second subjects is larger than the number of the first subject.

4. The image processing apparatus according to claim 1, further comprising:
    a main subject detecting device that detects a main subject from each of the plurality of images,
    wherein the attribute detecting device detects the first attribute obtained from a first main subject detected from the first image group, which is different from the second attribute obtained from a second main subject detected from the second image group.

5. The image processing apparatus according to claim 4, wherein the number of the second main subjects is larger than the number of the first main subject.

6. The image processing apparatus according to claim 1, wherein the first attribute is obtained from a plurality of images captured periodically by the first user.

7. The image processing apparatus according to claim 1,
wherein the first attribute is obtained from an imaging time of the first image group, and
where the second attribute is obtained from an imaging time of the second image group.

8. The image processing apparatus according to claim 1, further comprising:
a first notifying device that issues notification of event-related information on at least one of a product or a service related to the event on the basis of the first attribute detected by the attribute detecting device.

9. The image processing apparatus according to claim 8,
wherein the notifying device issues notification of the information on at least one of the product or the service related to the event at a time determined on the basis of the first attribute detected by the attribute detecting device.

10. The image processing apparatus according to claim 8,
wherein the notifying device notifies the first user of the information.

11. An image processing method comprising:
reading, from a storage device in which a plurality of images captured at the same event are stored, the plurality of images, by a reading device;
calculating a ratio of a number of users who imaged a specific subject among the plurality of images read by the reading device to a number of users who imaged the plurality of images read by the reading device, by a processor;
deciding a user who imaged the specific subject to be a first user based upon the calculated ratio, by the processor; and
detecting a first attribute obtained from a first image group captured at the same event by the first user, which is different from a second attribute obtained from a second image group captured at the same event by second users of which a number is larger than a number of the first user, by an attribute detecting device,
wherein the user is set as the first user in a case where the calculated ratio is less than a threshold value, and
the first attribute is set as a feature of the first user.

12. A non-transitory recording medium storing a computer-readable program for controlling a computer of an image processing apparatus, the program controlling the computer to execute:
reading a plurality of images from a storage device in which the plurality of images captured at the same event are stored;
calculating a ratio of a number of users who imaged a specific subject among the plurality of images read to a number of users who imaged the plurality of images read;
deciding a user who imaged the specific subject to be a first user based upon the calculated ratio; and
detecting a first attribute obtained from a first image group captured at the same event by the first user, which is different from a second attribute obtained from a second image group captured at the same event by second users of which a number is larger than a number of the first user,
wherein the user is set as the first user in a case where the calculated ratio is less than a threshold value, and
the first attribute is set as a feature of the first user.

\* \* \* \* \*